United States Patent [19]

Tortorello et al.

[11] 4,454,265

[45] Jun. 12, 1984

[54] AQUEOUS EPOXY-PHENOLIC COATINGS

[75] Inventors: Anthony J. Tortorello, Elmhurst; Donald R. Roberts, Roselle, both of Ill.

[73] Assignee: DeSoto, Inc., Des Plaines, Ill.

[21] Appl. No.: 477,490

[22] Filed: Mar. 21, 1983

[51] Int. Cl.$^3$ .......................... C09D 3/56; C09D 3/58
[52] U.S. Cl. .................................. 523/420; 523/100; 523/414; 523/424
[58] Field of Search ................ 523/100, 420, 414, 424

[56] References Cited

U.S. PATENT DOCUMENTS

| | | | |
|---|---|---|---|
| 4,096,105 | 6/1978 | McGinniss | 523/420 |
| 4,105,614 | 8/1978 | Davis et al. | 523/100 |
| 4,145,323 | 3/1979 | Sekmakas et al. | 523/424 |
| 4,222,918 | 9/1980 | Zentner et al. | 523/420 |
| 4,321,305 | 3/1982 | Castellucci et al. | 523/424 |

FOREIGN PATENT DOCUMENTS 3002865  7/1981  Fed. Rep. of Germany ...... 523/420

*Primary Examiner*—Ronald W. Griffin

*Attorney, Agent, or Firm*—Dressler, Goldsmith, Shore, Sutker & Milnamow, Ltd.

[57] ABSTRACT

Aqueous thermosetting coating compositions adapted for roll coat application are disclosed in which water has dispersed therein an adduct of a diglycidyl ether of a bisphenol having a 1,2-epoxy equivalency of at least 1.2 and an average molecular weight of from about 2000 to about 5000 with a stoichiometric proportion, based on epoxy and secondary amine, of diprimary amine having a single secondary amine group and each primary amine group blocked by a ketimine group. At least about 50% of the amine groups of this adduct are protonated with a volatile acid, and the ketimine groups hydrolyze in the water to provide primary amine functionality and ketone solvent in the aqueous medium. From 20% to 50%, based on total resin solids, of water insoluble, heat-hardening phenol-formaldehyde resin curing agent is employed for cure. The curing agents are added to the adduct in solution in water-miscible organic solvent, and cresol-formaldehyde curing agents are preferred.

12 Claims, No Drawings

AQUEOUS EPOXY-PHENOLIC COATINGS

DESCRIPTION

1. Field of Invention

This invention relates to aqueous coating compositions having a rheology appropriate for roll coating application and which contain a low concentration of volatile organic materials. The coating of the interior of food and beverage containers is particularly contemplated.

2. Background Art

In the present commercial coating of food and beverage containers, the can interiors are normally coated with solvent-based thermoset coatings containing a low concentration of resin solids dissolved in the solvent. It is desired to replace these coating compositions with thermosetting water-based coatings containing a small proportion of organic solvent and without further lowering the proportion of resin solids. Moreover, it is desired to employ epoxy-phenolic coatings because these are known to provide good properties when used to coat can interiors.

Thermosetting aqueous coatings containing amine-functional epoxy resin in combination with a phenoplast curing agent are known. However, these known compositions lack uniformly fine particle size and have unfavorable coating rheology so that effective roll coat application is difficult.

DISCLOSURE OF INVENTION

In accordance with this invention, a diglycidyl ether of a bisphenol having a 1,2-epoxy equivalency of at least about 1.2 and an average molecular weight (by calculation) of at least about 2000 and up to about 5000 is adducted with an amine consisting essentially of a diprimary amine having a single secondary amine group and each primary amine group blocked with a ketimine group. This adduct is blended, in water-miscible organic solvent medium, with a water insoluble, heat-hardening phenol-formaldehyde resin, most preferably a cresol-formaldehyde resin containing about 1 mol of formaldehyde per mol of cresol, preferably ortho-cresol, to form an aqueous coating composition adapted to thermoset on baking when this solution is dispersed in water with the aid of a volatile acid.

The phenol-formaldehyde resin in the compositions of this invention is used in an amount of from 20% to 50% of total resin solids, preferably from 30% to 45%. While cresol-formaldehyde resins are preferred, one may also employ a mixture of polymethylol phenols which may be bridged with ammonia or a primary amine, like dibutyl amine. It will be understood that when the proportion of phenol-formaldehyde resin is specified, that the balance of the resin solids consist essentially of the adduct. Also, and since phenol-formaldehyde resins are used for cure, the acid catalysts required for an aminoplast cure are not needed herein.

Ketimine-blocked diprimary amines containing a single secondary amine group are important, such as diethylene triamine or dipropylene triamine. When amines of different structure are adducted with the same epoxy resins, the excellent solubility in water needed herein and which is supplied by the two primary amine groups provided when the ketimine-blocking groups used herein hydrolyze in water, is not obtained. Without the two primary amine groups one obtains excessive particle size which destroys the rheology of the aqueous coating. Fine particle size provides the high viscosity required for proper roll coating application.

The molecular weight of the diglycidyl ether is also important. If a lower molecular weight epoxy-functional material is employed, then more amine must be used to consume the larger number of glycidyl groups supplied by the lower molecular weight product. This causes the release of more ketone when the ketimine groups hydrolyze in the water medium, and this released ketone undesirably increases the volatile organic content of the aqueous coatings under consideration. Preferred diglycidyl ethers have a 1,2-epoxy equivalency of from about 1.6 to 2.0. The Shell product Epon 1007 and its commercial equivalent DER 667 are preferred. These are diglycidyl ethers of bisphenol A having an average molecular weight of about 3800 and an epoxy equivalent weight of about 1800.

The invention will be more fully understood from the following description of the production of a typical aqueous coating composition.

First, one prepares a ketimine-blocked diprimary amine by reacting diethylene triamine with two molar proportions of an appropriate ketone such as methyl isobutyl ketone, in known fashion. This is itself well known.

Second, and using the product DER 667 to illustrate a suitable high molecular weight diglycidyl ether of bisphenol A, this diglycidyl ether is reacted with one mol of the ketimine-blocked diethylene triamine per epoxy equivalent in the diglycidyl ether. This destroys the epoxy functionality and binds the ketimine-blocked diethylene triamine to the diglycidyl ether through its single secondary amino hydrogen atom.

Third, the reaction product of step 2 is placed in solution in a water-miscible organic solvent, such as 2-butoxy ethanol, if such solvent is not already present. The solvent is to provide liquidity at the temperature used for water dispersion (about 80° C.), and this can usually be achieved by having present from 20% to 40% of solvent, based on the weight of the solution. Consistent with the desired liquidity, one would wish to use as little organic solvent as possible. Water miscible solvents are well known in the art.

Then, in any order, one adds a volatile acid, such as acetic acid, and the selected phenol-formaldehyde resin curing agent to the solvent solution of step 3, and the hot solution is agitated as needed to dissolve the added resin and form a compatible mixture containing the same. The acid is used in an amount sufficient to protonate at least about 50% of the amino nitrogen groups present. One can use up to about 100% of the acid needed to protonate all the amino hydrogen atoms, and the maximum proportion of acid is a function of the lowered pH which can be tolerated. The lower the pH, the more corrosive the aqueous composition, as is well known. There is normally no purpose in having any excess acid present and only enough acid to provide a dispersion of desired fine particle size is normally used.

Lastly, the solution in which the amino nitrogen atoms have been protonated with acid is dispersed in water (deionized water is normally used) with agitation, and this directly forms an aqueous coating composition which meets all the requirements of the FDA for approval of coatings intended to be used in contact with foods and beverages. The coatings of can end interiors is particularly contemplated.

It will be understood that since ketimine groups hydrolyze in the aqueous medium, primary amine functionality is generated in the aqueous coating composition. Sufficient water is added to provide an aqueous composition containing from 20% to 45% of total resin solids, preferably from 30% to 35%. One may use enough water to provide a pourable mixture at room temperature (25° C.), and then dilute this pourable mixture to the desired coating viscosity at the time of use.

Throughout this application, and in the examples which follow, all parts are by weight, unless otherwise specified.

EXAMPLE 1

(Preparation of Epoxy Phenolic Dispersion)

Into a 5000 ml. three neck flask was weighed 400 grams (0.217 equiv.) of DER 667 epoxy resin, 124 grams of 2-butoxy ethanol, 124 grams of 2-methoxy ethyl acetate, and 62 grams of n-butanol. The flask was equipped with a reflux condenser with drying tube, a dry nitrogen inlet, thermometer, mechanical stirrer and pressure-equalized dropping funnel. The flask was heated to 110° C. to dissolve the epoxy resin in the solvents. After all the epoxy resin had been dissolved, the solution was cooled to 70° C.

Into the dropping funnel was weighed 65.4 grams (0.228 equiv) of diethylene triamine which had been ketimine-blocked with 2 mols of methyl isobutyl ketone. The equivalent weight of this material was 95.625 grams which can be compared with a theoretical value of 89.154 grams. When the temperature of the solution stabilized at 70° C., the ketimine was added over about three minutes with good agitation. The 70° C. temperature was maintained until an epoxide value of 1.47 miliequivalents per gram was obtained (which took about one hour). The temperature was then increased to 80° C. and 322 grams of an o-cresol-formaldehyde resin containing 1 mol of formaldehyde per mol of o-cresol was added to the flask. The Reichhold product Varcum 1410 may be used as the o-cresol-formaldehyde resin. The solution was kept at 80° C. for one hour to insure that all the added resin had been dissolved.

Into the addition funnel was weighed 26.7 grams (0.444 equiv.) of acetic acid. The acid was then added to the flask dropwise with good agitation while maintaining 80° C. After all the acid had been added, agitation was continued for five minutes. 1261 grams of deionized water was then added to the addition funnel and the water was added dropwise with vigorous agitation to prevent the added water from pooling at the surface. The temperature was maintained at 80° C. and the water was added in two to three hours.

When water addition was complete, the solution was cooled to 50° C. and poured from the flask to provide the desired coating composition. This solution has a solids content of about 33% and a room temperature viscosity in the range of 500 to 1000 centipoises and can be roll coated without modification. In some instances it is desirable to lower the viscosity by diluting with water, and this can be done down to about a solids content of 25%.

In a typical application, the aqueous solution is applied by roll coating to deposit 4 mg./in.$^2$ of coating solids, and the coatings are cured by baking at 350° F. to 400° F. for periods of from ten to fifteen minutes. The coatings are hard, flexible, and solvent resistant, and are able to replace epoxy/phenolic solvent solution coatings now in use without sacrificing desired properties.

More particularly, the coatings of this invention can be applied over electrolytic tinplate, tin-free steel or aluminum. After baking, as above described, typical properties are a pencil hardness of from 2H to 3H and the ability to resist more than 100 double rubs with an acetone-saturated cloth. Since use on food and beverage containers is contemplated, testing is carried out with steam at 250° F. for 90 minutes and no loss of adhesion and no blushing is observed. Since can ends must be fabricated, these are tested to see whether fabrication has ruptured the coating, and the coatings herein pass this test. Also, and on aluminum, beer tasting tests indicate that the coatings herein are as good as the conventional solvent coatings now in use.

What is claimed is:

1. An aqueous coating composition adapted to thermoset on baking comprising, water having dispersed therein diglycidyl ether of a bisphenol having a 1,2-epoxy equivalency of at least 1.2 and an average molecular weight of from about 2000 to about 5000, adducted with a stoichiometric proportion, based on epoxy and secondary amine, of diprimary amine having a single secondary amine group and each primary amine group blocked by a ketimine group, at least about 50% of the amine groups of said adduct being protonated with a volatile acid, said ketimine groups being hydrolyzed in the aqueous medium to provide primary amine groups therein, and from 20% to 50%, based on total resin solids, of water insoluble, heat-hardening phenol-formaldehyde resin curing agent.

2. An aqueous coating composition as recited in claim 1 in which said diglycidyl ether is a derivative of bisphenol A having a 1,2-epoxy equivalency of from 1.6 to 2.0.

3. An aqueous coating composition as recited in claim 2 in which said ketimine-blocked diprimary amine is diketimine-blocked diethylene triamine.

4. An aqueous coating composition as recited in claim 3 in which said diethylene triamine is ketimine-blocked with methyl isobutyl ketone.

5. An aqueous coating composition as recited in claim 2 in which said phenol-formaldehyde resin curing agent is a cresol-formaldehyde resin containing about 1 mol of formaldehyde per mol of cresol.

6. An aqueous coating composition as recited in claim 5 in which said cresol is ortho-cresol.

7. An aqueous coating composition as recited in claim 5 in which said phenol-formaldehyde resin curing agent is a polymethylol phenol.

8. An aqueous coating composition as recited in claim 7 in which said polymethylol phenol is ammonia or amine-bridged.

9. An aqueous coating composition as recited in claim 1 in which said coating composition contains from 20% to 45% of total resin solids.

10. An aqueous coating composition as recited in claim 9 in which said coating composition is of roll coating viscosity.

11. A method of providing an aqueous coating composition adapted to thermoset on baking comprising adducting a diglycidyl ether of a bisphenol having a 1,2-epoxy equivalency of at least 1.2 and an average molecular weight of from about 2000 to about 5000, with a stoichiometric proportion, based on epoxy and secondary amine, of diprimary amine having a single secondary amine group and each primary amine group blocked by a ketimine group, dissolving from 20% to 50%, based on total resin solids, of water insoluble, heat-hardening phenol-formaldehyde resin curing agent in said adduct in the presence of from 20% to 40% of water-miscible organic solvent, based on the weight of the solution, and dispersing said adduct-curing agent solution in water with at least about 50% of the amine groups of said adduct protonated with a volatile acid to stably disperse said adduct and said curing agent in the aqueous medium and to cause said ketimine groups to become hydrolyzed to provide primary amine groups and ketone solvent in the aqueous medium.

12. A method as recited in claim 11 in which said diglycidyl ether is a derivative of bisphenol A having a 1,2-epoxy equivalency of from 1.6 to 2.0, and diethylene triamine which has been ketimine-blocked with methyl isobutyl ketone is adducted with said diglycidyl ether.

* * * * *